(12) United States Patent
Park et al.

(10) Patent No.: US 11,028,943 B2
(45) Date of Patent: Jun. 8, 2021

(54) CONTROL BUTTERFLY VALVE

(71) Applicant: P&K ENG Co., Ltd., Ulsan (KR)

(72) Inventors: Yong Taek Park, Seoul (KR); Myoung Joon Kwon, Jeungpyeong-gun (KR)

(*) Notice: Subject to any disclaimer, the term of this patent is extended or adjusted under 35 U.S.C. 154(b) by 0 days.

(21) Appl. No.: 16/377,596

(22) Filed: Apr. 8, 2019

(65) Prior Publication Data

US 2019/0316708 A1 Oct. 17, 2019

(30) Foreign Application Priority Data

Apr. 12, 2018 (KR) .......................... 10-2018-0042906

(51) Int. Cl.
*F16K 47/04* (2006.01)
*F16K 1/22* (2006.01)

(52) U.S. Cl.
CPC .............. *F16K 47/045* (2013.01); *F16K 1/22* (2013.01)

(58) Field of Classification Search
CPC ...... F16K 1/2014; F16K 1/2057; F16K 1/222; F16K 1/2263; F16K 1/54; F16K 47/045; F16K 47/14
See application file for complete search history.

(56) References Cited

U.S. PATENT DOCUMENTS

| 3,677,297 | A * | 7/1972 | Walton ................... | F16K 1/222 137/625.28 |
| 2003/0122100 | A1 * | 7/2003 | Baumann ............... | F16K 1/222 251/305 |
| 2004/0051071 | A1 * | 3/2004 | Ando ...................... | F16K 1/222 251/208 |

FOREIGN PATENT DOCUMENTS

| EP | 0101323 A2 * | 2/1984 | ............ F16K 1/222 |
| JP | 57-120768 | 7/1982 | |
| JP | 1-78774 | 5/1989 | |
| JP | 2003-97732 | 4/2003 | |
| JP | 2013119867 A * | 6/2013 | ............ F16K 1/222 |
| JP | 2015-129550 | 7/2015 | |
| KR | 10-0961681 | 6/2010 | |
| KR | 10-2013-123615 | 11/2013 | |
| KR | 10-1712632 | 3/2017 | |
| WO | WO-2013066245 A1 * | 5/2013 | ............ F16K 47/08 |

OTHER PUBLICATIONS

English Specification of 10-0961681.
English Specification of 2003-97732.
English Specification of 10-2013-0123615.
English Specification of 10-1712632.
English Specification of 1-78774.
English Specification of 2015-129550.
English Specification of 57-120768.

* cited by examiner

*Primary Examiner* — Hailey K. Do
(74) *Attorney, Agent, or Firm* — Antonio Ha & U.S. Patent, LLC

(57) ABSTRACT

A control butterfly valve comprises a valve body having a fluid passage through which a fluid flows, a valve disc controlling an opening and closing of the fluid passage of the valve body, and a diffuser including a passing hole configured to allow the fluid, which passes through the valve disc, to pass therethrough and a passing part configured to allow the fluid, which passes through the valve disc at a low speed, to pass therethrough.

2 Claims, 4 Drawing Sheets

(a)

(b)

(c)

(d)

CONTROL BUTTERFLY VALVE

CROSS-REFERENCE TO RELATED APPLICATION(S)

This patent application claims priority under 35 U.S.C. § 119 to Korean Patent Application No. 10-2018-0042906, filed on Apr. 12, 2018, in the Korean Intellectual Property Office, the disclosure of which is incorporated by reference herein in its entirety.

TECHNICAL FIELD

Embodiments of the disclosure relate to a control butterfly valve and, more specifically, to a control butterfly valve capable of efficiently controlling flowrate and preventing noise and vibrations although the valve disc is opened in a smaller range by fluid.

DESCRIPTION OF RELATED ART

Typically, butterfly valves are installed on the passage through which, e.g., water, oil, or gas flows, to open or close the flow of fluid. Butterfly valves take up a smaller space as compared with other types of valves.

A butterfly valve includes a valve body having a fluid passage penetrated to allow for flow of fluid, a valve shaft connected to a valve disc to control the valve disc, a sheet fastener to fasten the valve body, and a sheet positioned between the sheet fastener and the valve body to control movement and flow of fluid depending on the position of the valve disc.

The butterfly valve may show various flowrates of fluid depending on the degree of opening (VALVE OPENING POSITION) as shown in FIG. 1.

Valves with the characteristics as denoted with number 4 (EQUAL PERCENTAGE) of FIG. 1 may be globe valves that produce a relatively small flow of fluid at a lower degree of opening and exhibit a good flow property. Such globe valves are widely used as control valves.

Globe types of control valves may oftentimes be used for pipes with a caliber of 6 inches or less but usually not to larger-caliber piping because of cost and size issues.

However, butterfly valves may be manufactured easily in a relatively large size, with a simplified structure, show the number 3 flow characteristics (LINEAR), and be relatively easy to control and, thus, are widely used as control valves.

However, when a small amount of flow is needed and the valve disc is opened at a small opening degree (typically, an opening degree of 15% or less), lots of noise and vibrations may be created and, due to its linear, rather than an equal percentage curve (EQUAL PERCENTAGE), characteristics, an excessive variation in flowrate may occur, which may render it difficult to precisely control the valve. Thus, conventional butterfly valves may be difficult to use as control valves.

SUMMARY

According to an embodiment of the disclosure, a control butterfly valve comprises a valve body having a fluid passage through which a fluid flows, a valve disc controlling an opening and closing of the fluid passage of the valve body, and a diffuser including a passing hole configured to allow the fluid, which passes through the valve disc, to pass therethrough and a passing part configured to allow the fluid, which passes through the valve disc at a low speed, to pass therethrough. The passing part is formed in a lower part of the diffuser to face a lower part of the valve disc, and wherein the passing part has a plurality of holes through which the fluid passes.

Eddy producing parts may be formed in an upper part and a lower part of the valve disc to create an eddy of the fluid.

According to an embodiment of the disclosure, the control butterfly valve may further comprise a sheet formed on an inner circumferential surface of the valve body to seal off the valve disc. A cutoff part may be inclinendly formed in a predetermined length in an upper part of the valve disc which faces a ceiling surface of the sheet.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
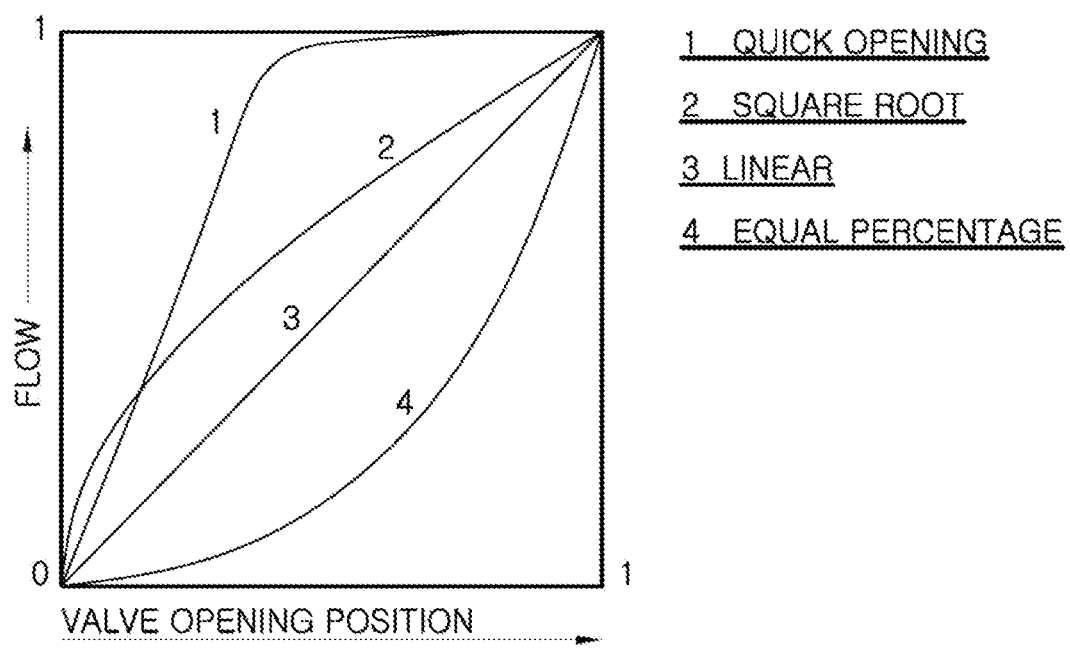
FIG. 1 is a graph illustrating opening positions of a valve.

Advantages and features of the disclosure, and methods for achieving the same may be understood through the embodiments to be described below taken in conjunction with the accompanying drawings.

However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

Hereinafter, exemplary embodiments of the inventive concept will be described in detail with reference to the accompanying drawings. The inventive concept, however, may be modified in various different ways, and should not be construed as limited to the embodiments set forth herein. However, the disclosure may be implemented in other various forms and is not limited to the embodiments set forth herein. Like reference denotations may be used to refer to the same or similar elements throughout the specification and the drawings.

Figure 2:
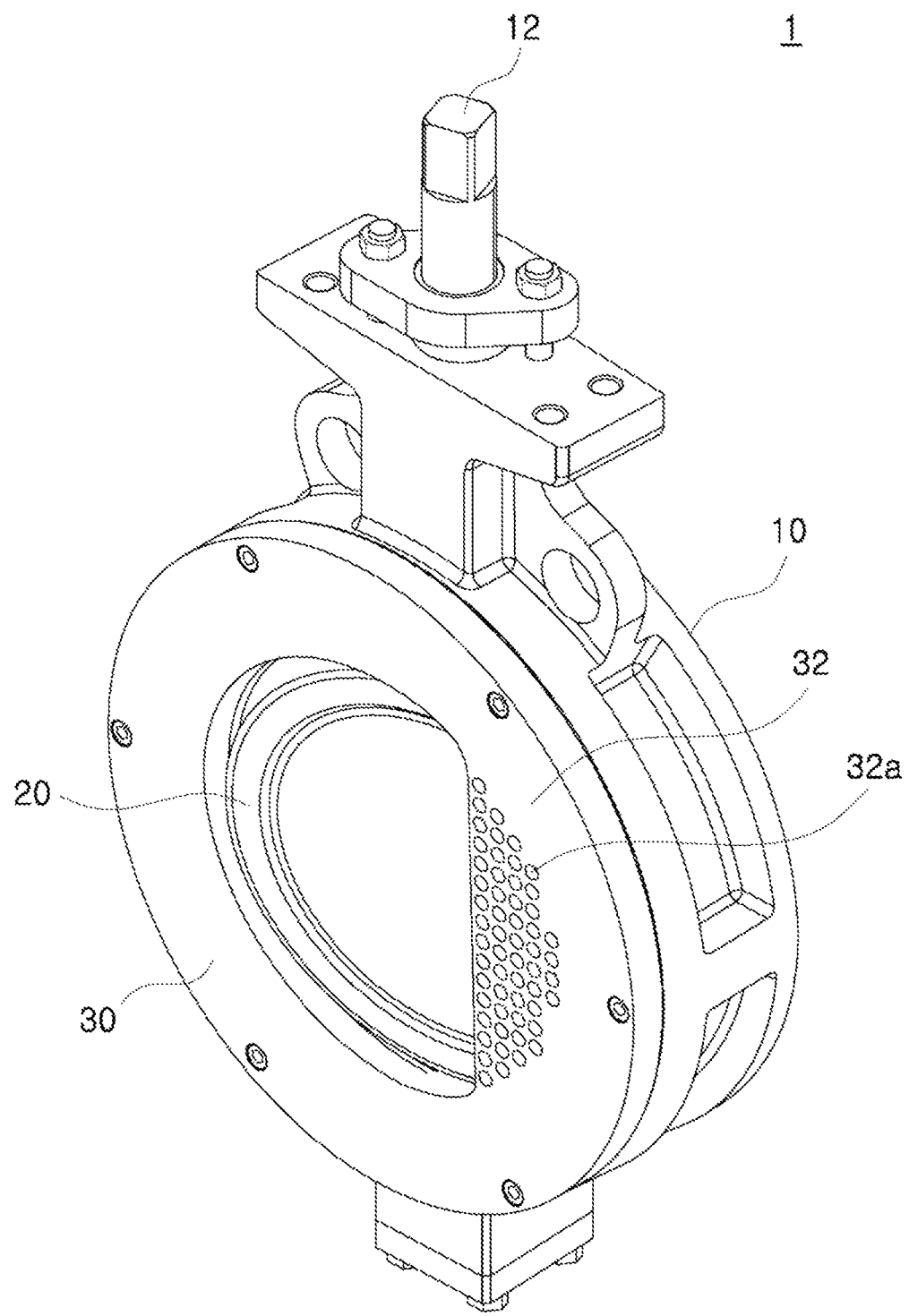
FIG. 2 is a perspective view illustrating a control butterfly valve according to an embodiment of the disclosure.
Figure 3:
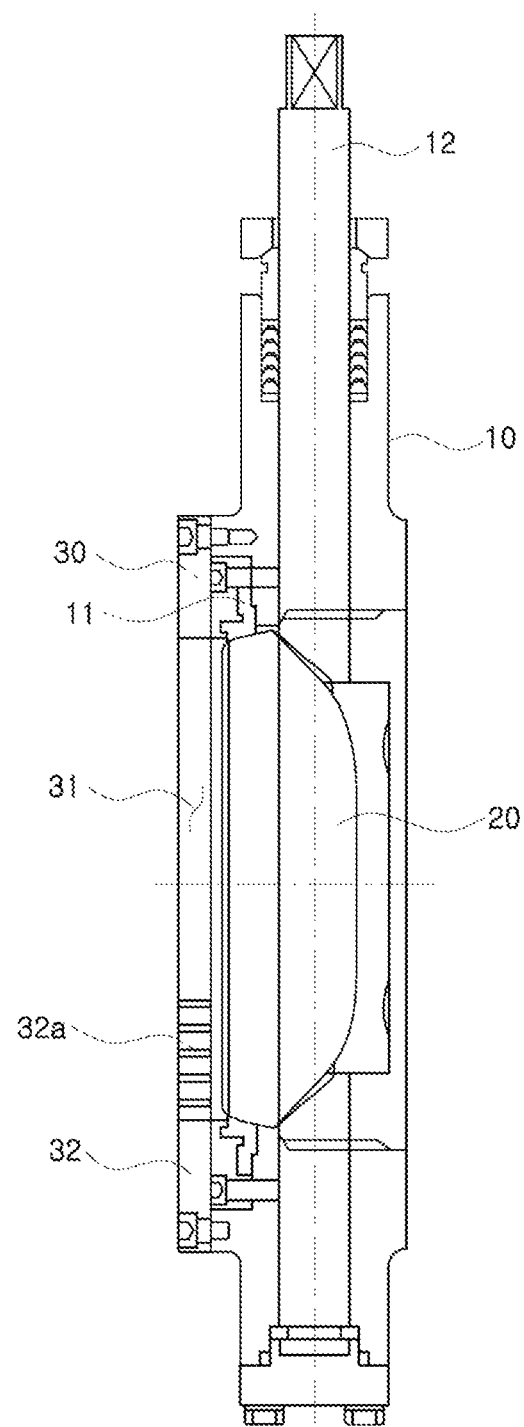
FIG. 3 is a cross-sectional view illustrating a control butterfly valve according to an embodiment of the disclosure.
Figure 4:
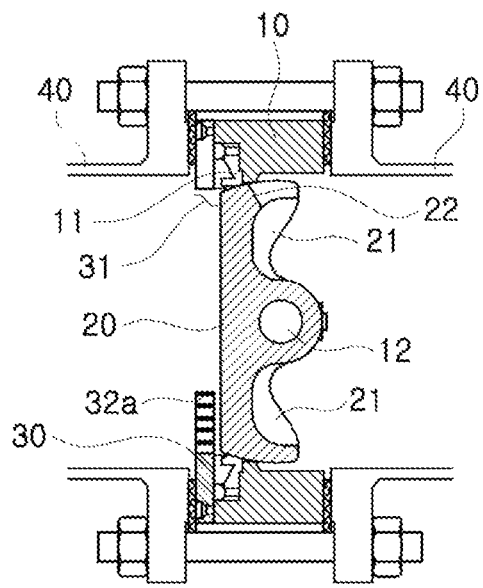
FIG. 4 is a cross-sectional view illustrating the degree of opening of a control butterfly valve depending on the flow velocity of fluid according to an embodiment of the disclosure.
Figure 4:
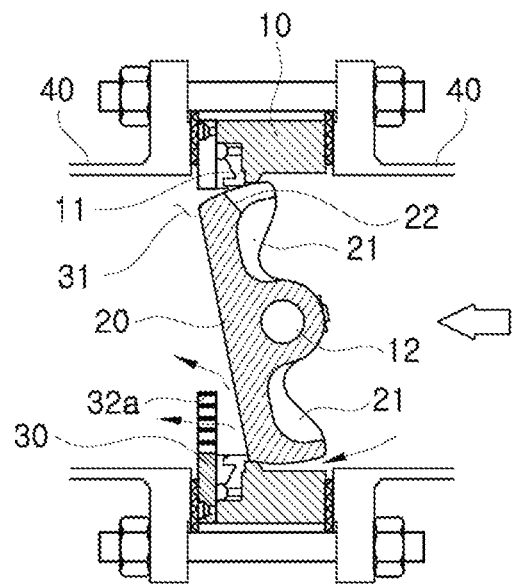
Figure 4:
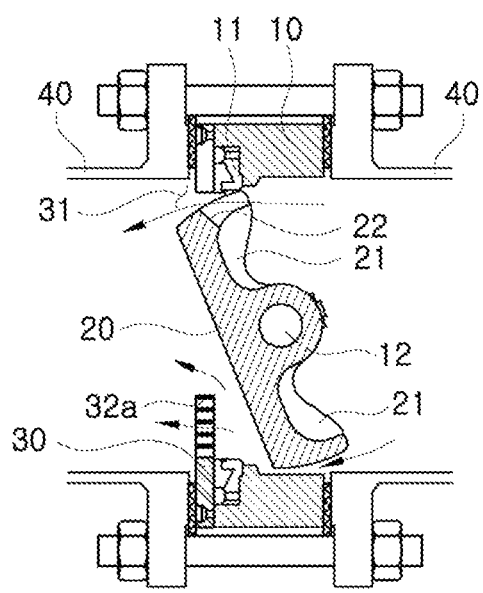
Figure 4:
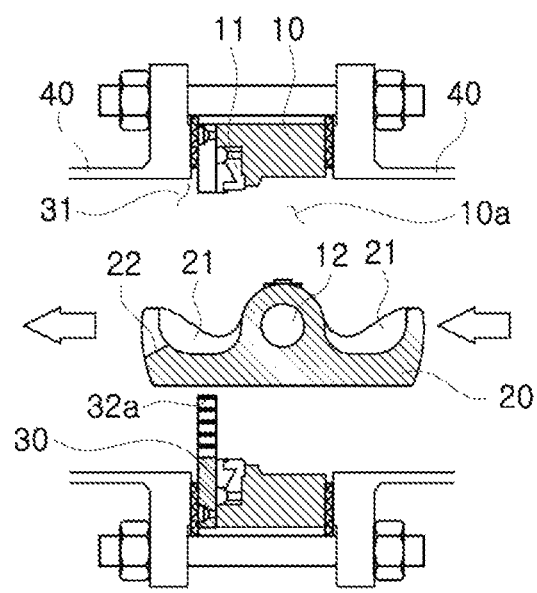

FIG. 2 is a perspective view illustrating a control butterfly valve according to an embodiment of the disclosure. FIG. 3 is a cross-sectional view illustrating a control butterfly valve according to an embodiment of the disclosure. FIG. 4 is a cross-sectional view illustrating the degree of opening of a control butterfly valve depending on the flow velocity of fluid according to an embodiment of the disclosure.

According to an embodiment of the disclosure, a control butterfly valve 1 may be implemented so that its flow property is closer to an equal percentage curve, thereby rendering it easier to control. Further, the flow of fluid at the outlet may be controlled to reduce the pressure gap between the inlet and the outlet, so that noise and vibrations may be prevented although the valve disc 20 is opened in a small range by fluid flowing at lower speed.

According to an embodiment of the disclosure, the control butterfly valve 1 may include a valve body 10, a valve disc 20, and a diffuser 30.

The valve body 10 may have a fluid passage 10a formed therein to allow a powder, sludge, or other various fluids to flow therethrough. The valve body 10 is fastened between piping 40 of a pipeline.

A sealing sheet 11 that comes in contact with an edge surface of the valve disc 20 when the valve disc 20 opens or closes the fluid passage 10a is fastened by a retainer to an inner circumferential surface of the valve body 10.

The valve disc 20 is placed inside the valve body 10 and is fastened to a rotating shaft 12 installed in the valve body 10, sealing off the fluid passage 10a and blocking the flow of fluid.

A cutoff part 22 may be formed at a top side of the valve disc 20 which faces a ceiling surface of the sheet 11 to reduce noise and vibrations inside the piping 40 by interaction with a passing part 32 described below.

The cutoff part 22 may be formed by inclinedly cutting the valve disc 20 in a predetermined length.

The functions of the cutoff part 22 are described below detail in connection with the passing part 32.

Eddy producing parts 21 are formed in the valve disc 20 to prevent noise and vibrations by the fluid flowing in at lower speed.

For example, when a conventional butterfly valve is used as a control valve, it is used at an opening degree typically ranging from 30% to 55%.

When the fluid flows at low speed, the valve disc 20 is opened not fully but at an opening degree of about 10% and allows the pass to flow through.

When the valve disc 20 is opened at such a small degree of opening, the fluid may be pushed to a relevant part (e.g., the inner wall of the pipe 40) and thereby be sharply increased in pressure and speed. After passing through the valve disc 20, the fluid experiences an instantly drastic reduction in internal pressure, thereby turning into gas and producing noise and vibrations-so-called 'cavitation.' As such, the valve disc 20 may cause a cavitation or, at least, high-tone noise and vibrations.

The eddy producing parts 21 are provided to resolve such cavitation or noise, vibration issues. The eddy producing parts 21 are formed in a surface of the valve disc 20 which faces in the direction where the fluid flows in.

The eddy producing parts 21 may be depressions, holes, or grooves formed on an upper and lower side of the rotating shaft 12.

The eddy producing parts 21 may be substantially semicircular in shape and turn the flow flowing in through the pipe 40, producing an eddy. Thereby, the eddy producing parts 21 may prevent the valve disc 20 from being easily opened by the fluid at a low opening degree and may distribute the pressure of fluid pushed to the inner wall of the pipe 40, thereby preventing noise and vibrations.

Further, the eddy producing parts 21 may be formed to be symmetrical with each other, e.g., an upper eddy producing part 21 and a lower eddy producing part 21. An eddy of the fluid produced by the upper eddy producing part 21 may be canceled off with an eddy of the fluid produced by the lower eddy producing part 21. The fluid with the eddies canceled off may be hit and interfered by another portion of the fluid newly coming in, thereby lowering the speed and pressure of the fluid.

Thus, the control butterfly valve 1 may enable more efficient distribution of the pressure of fluid pushed to the inner wall of the pipe 40, thereby suppressing noise and vibrations in a more efficient manner.

When a conventional butterfly valve is used as a control valve, it is used at an opening degree typically ranging from 30% to 55%.

In other words, the conventional butterfly valve shows a linear flow rate property and is thus easy to control. However, when fluid flows at a low degree of opening, the conventional butterfly valve exhibits poor opening control characteristics due to noise and vibrations.

In adopting butterfly valves as control valves, a required flowrate is calculated and valves and piping sized to fit the calculated flowrate are used. However, in such a specific situation where the valves are operated at a small opening degree departing off the calculated range, noise and vibrations may be created. The reduction of noise and vibrations may be achieved as follows: controlling a manual valve, which is attached behind the control valve on the pipeline, to reduce the pressure gap between the inlet and outlet in which way the flowrate may be manually reduced; and then increasing the opening degree of the control valve to thereby reduce noise and vibrations.

However, this way may cause hardship and inconvenience. The diffuser 30 may be provided to address such hardship and inconvenience. The diffuser 30 may be coupled onto one surface of the valve body 10 and may include a passing hole 31 that allows the fluid, which passes through the fluid passage 10a, to pass therethrough as the valve disc 20 is open and the passing part 32 that allows the fluid at a low opening degree to pass therethrough.

According to an embodiment of the disclosure, the passing hole 31 may be sized to be 10% to 30% smaller in cross-sectional area than the fluid passage 10a.

The passing part 32 may be intended for adjusting the pressure of fluid. The passing part 32 may be formed under the passing hole 31 to face a lower part of the valve disc 20. The passing part 32 has multiple holes 32a through which the fluid passes. The holes 32a are spaced apart from each other by a predetermined interval.

For example, when the fluid reduces in velocity and the valve disc 20 is open by about 10%, the upper part of the valve disc 20, where the cutoff part 22 has been formed, may come in contact with the sheet 11 to block the flow of fluid, but the lower part of the valve disc 20 is spaced apart from the sheet 11 to allow a small amount of fluid to pass.

After passing through the fluid passage 10a, the fluid flows through the multiple holes and, thus, the pressure gap between the inlet A and the outlet B of the fluid may be significantly reduced as compared with by the conventional butterfly valve.

Thus, noise and vibrations which may be created by the flow of fluid may be prevented.

Further, as the pressure gap between the inlet A and the outlet B reduces, the fluid may slow down as well. Thus, noise and vibrations which may be created when fluid flows at a low opening degree may remarkably be reduced.

Thus, the control butterfly valve 1 may turn its flowrate characteristic depending on the degree of opening from the linear flowrate characteristic into an equal percentage curve characteristic in which low-opening degree flowrate adjustment may be easy and, thus, be more suitable for flowrate control.

According to the embodiments of the disclosure, the control butterfly valve may enhance the functions of the valve disc that controls the opening and closing of the fluid passage and allow the flow characteristic of the fluid to be closer to an equal percentage curve characteristic at a low opening degree. Thus, the control butterfly valve may be easy to control.

According to the embodiments of the disclosure, the control butterfly valve may reduce the pressure gap between the inlet and outlet by controlling the flow of fluid. Thus, although the valve disc is open in a small range by the fluid flowing at low speed, noise and vibrations may be prevented.

It will be appreciated by one of ordinary skill in the art that the disclosure may be implemented in other various specific forms without changing the essence or technical spirit of the disclosure. Thus, it should be noted that the above-described embodiments are provided as examples and should not be interpreted as limiting. It should be noted that the scope of the disclosure is defined by the appended claims rather than the described description of the embodiments and include all modifications or changes made to the claims or equivalents of the claims.

What is claimed is:

1. A control butterfly valve, comprising:
   a valve body having a fluid passage through which a fluid flows;
   a valve disc controlling an opening and closing of the fluid passage of the valve body; and
   a diffuser including:
      a passing hole 10% to 30% smaller in cross-sectional area than the fluid passage and configured to allow the fluid, which passes through the valve disc, to pass therethrough; and
      a passing part configured to allow the fluid, which passes through the valve disc at a low speed, to pass therethrough, wherein the passing part is formed in a lower part of the diffuser to face a first lower part of the valve disc, wherein the passing part has a plurality of holes smaller in size than the passing hole and through which the fluid passes, wherein eddy producing parts are formed, in the same direction as one another, in first upper part and a second lower part of the valve disc to create an eddy of the fluid, and wherein an inclined cutoff part is formed in second upper part of the valve disc.

2. The control butterfly valve of claim 1, further comprising a sheet formed on an inner circumferential surface of the valve body to seal off the valve disc, wherein the inclined cutoff part is formed in a predetermined length in the second upper part of the valve disc which faces a ceiling surface of the sheet.

* * * * *